United States Patent
Kim

(10) Patent No.: US 10,752,305 B2
(45) Date of Patent: Aug. 25, 2020

(54) STAIR-CLIMBING TYPE DRIVING DEVICE AND CLIMBING DRIVING METHOD

(71) Applicant: Joon-Hyung Kim, Seoul (KR)

(72) Inventor: Joon-Hyung Kim, Seoul (KR)

(73) Assignee: ROBO3 CO., LTD., Seoul (KR)

( * ) Notice: Subject to any disclaimer, the term of this patent is extended or adjusted under 35 U.S.C. 154(b) by 220 days.

(21) Appl. No.: 16/148,987

(22) Filed: Oct. 1, 2018

(65) Prior Publication Data

US 2019/0367112 A1 Dec. 5, 2019

(30) Foreign Application Priority Data

Jun. 1, 2018 (KR) .................. 10-2018-0063376

(51) Int. Cl.
| | | |
|---|---|---|
| *B62D 57/028* | (2006.01) | |
| *B60K 7/00* | (2006.01) | |
| *B62D 57/024* | (2006.01) | |
| *B60K 17/356* | (2006.01) | |

(52) U.S. Cl.
CPC .......... *B62D 57/028* (2013.01); *B60K 7/0007* (2013.01); *B60K 17/356* (2013.01); *B62D 57/024* (2013.01)

(58) Field of Classification Search
CPC .......................... B62D 57/024; B62D 57/028
See application file for complete search history.

(56) References Cited

U.S. PATENT DOCUMENTS

| | | | |
|---|---|---|---|
| 8,370,990 B2* | 2/2013 | Yu ..................... | B62D 57/028 15/319 |
| 8,469,131 B2* | 6/2013 | Lee .................... | B60G 17/019 180/209 |
| 2015/0105940 A1* | 4/2015 | Takase ............... | B62D 57/024 701/1 |
| 2017/0066490 A1* | 3/2017 | Fauroux ............. | B25J 9/026 |

* cited by examiner

*Primary Examiner* — Kevin Hurley
(74) *Attorney, Agent, or Firm* — John K. Park; Park Law Firm

(57) ABSTRACT

Disclosed are a stair-climbing type driving device and a climbing driving method thereof. It is an object of the present invention to provide a stair-climbing type driving device, which can climb upstairs in safety regardless of height and width of the stairs when the disabled, common people who want to experience four-wheel driving devices, or robots for fire extinguishment or industrial use climb up the stairs, and a climbing driving method of the stair-climbing type driving device.

2 Claims, 7 Drawing Sheets

[Figure 1]
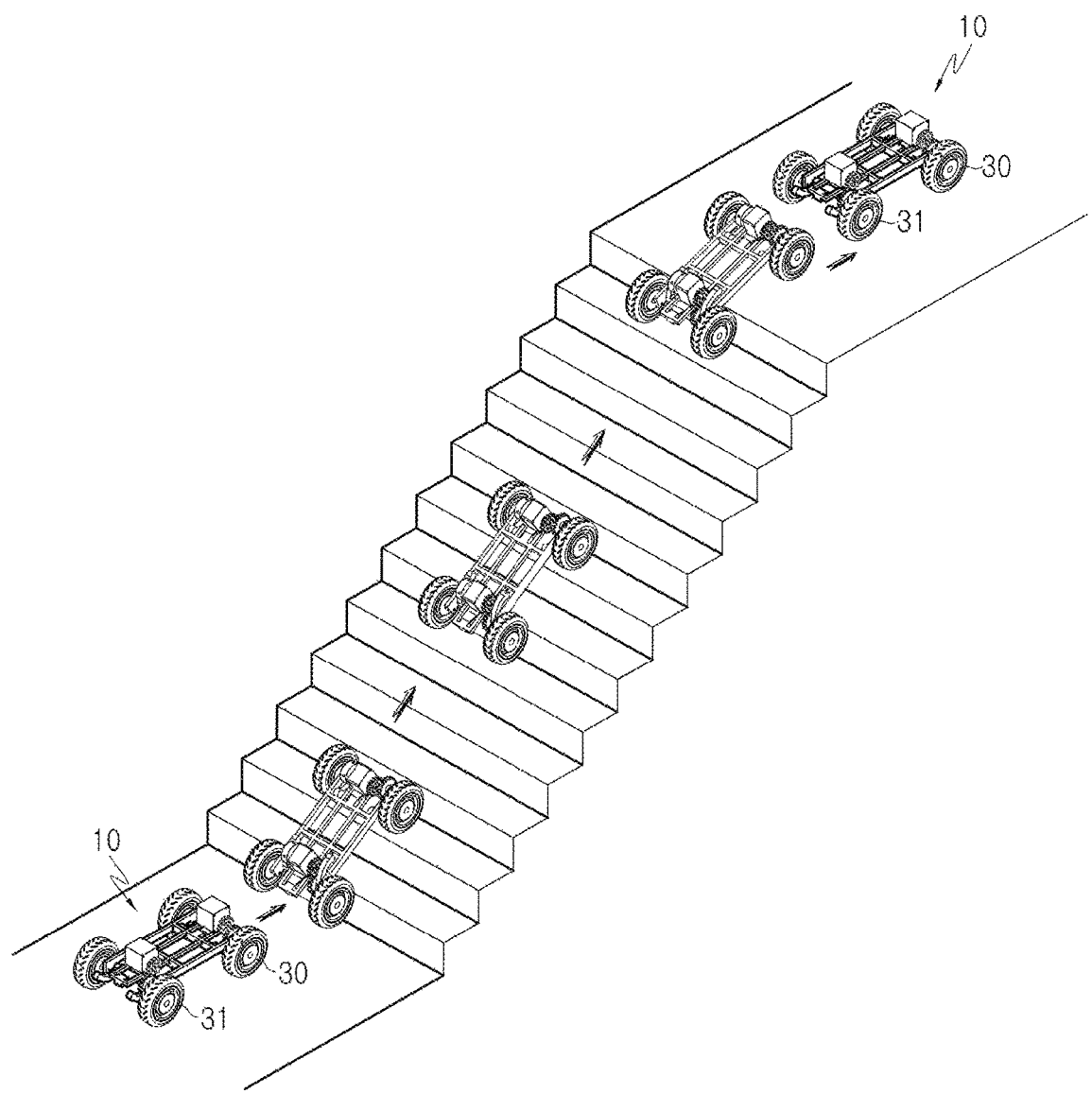

【Figure 2】
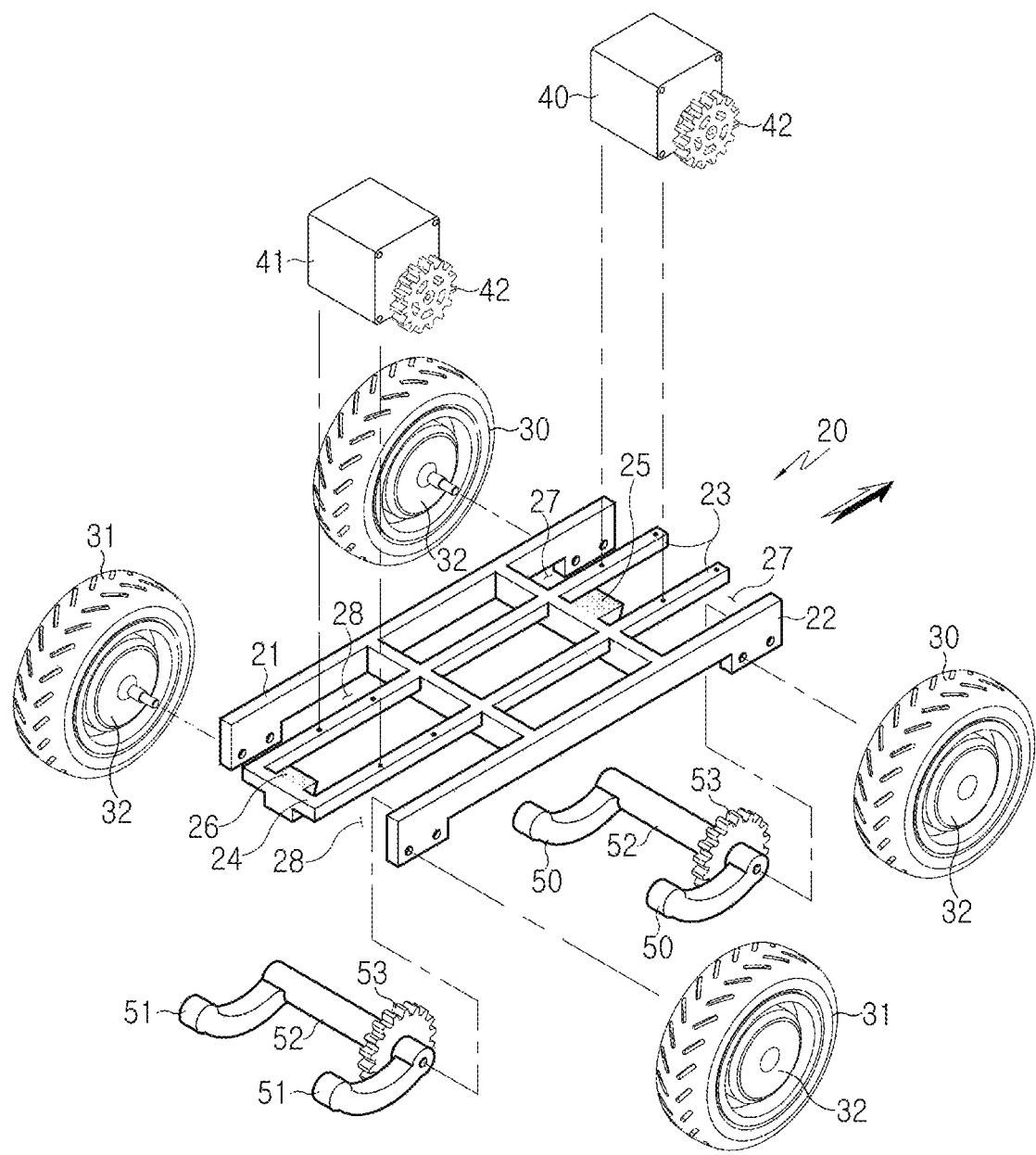

【Figure 3】
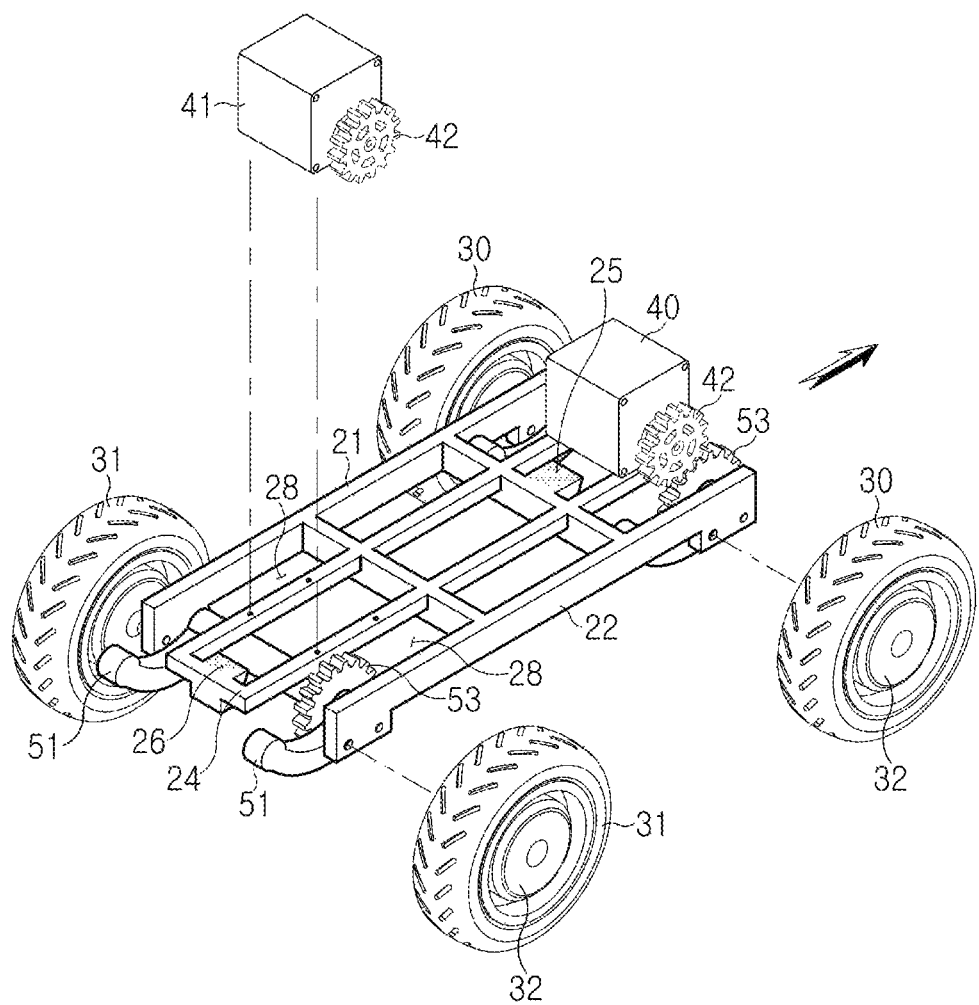

[Figure 4]
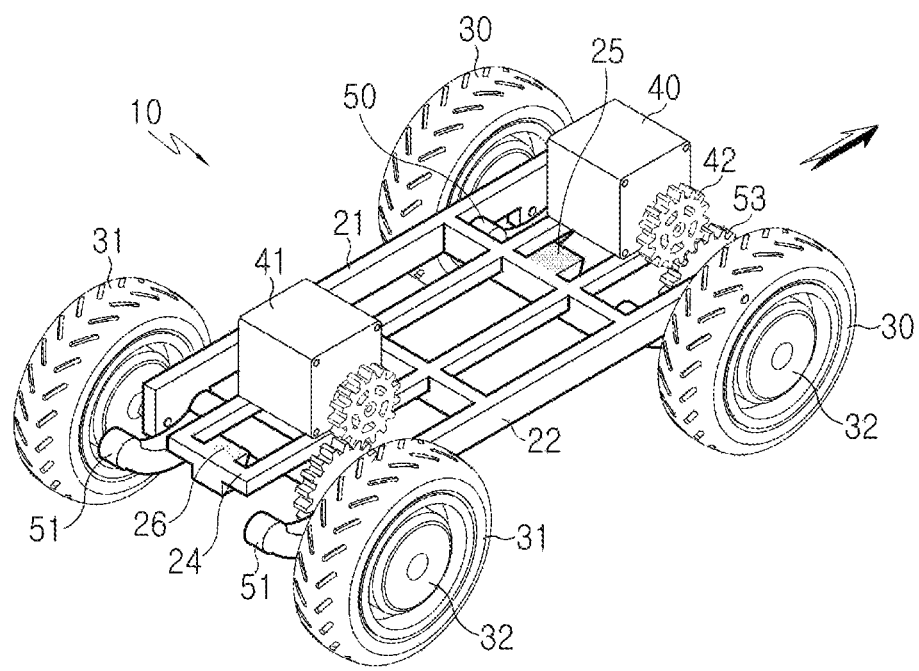
(a)
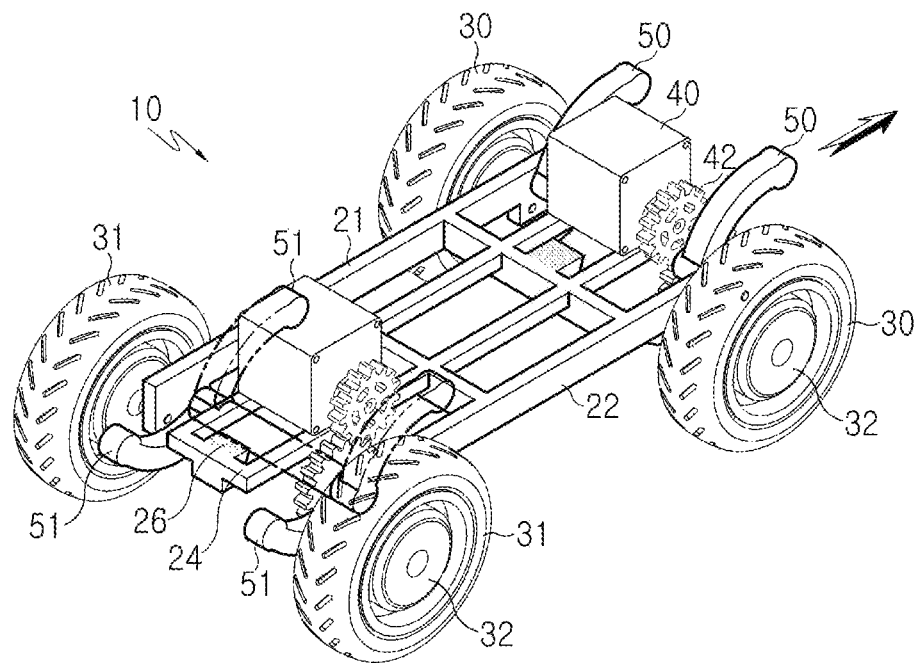
(b)

【Figure 5】
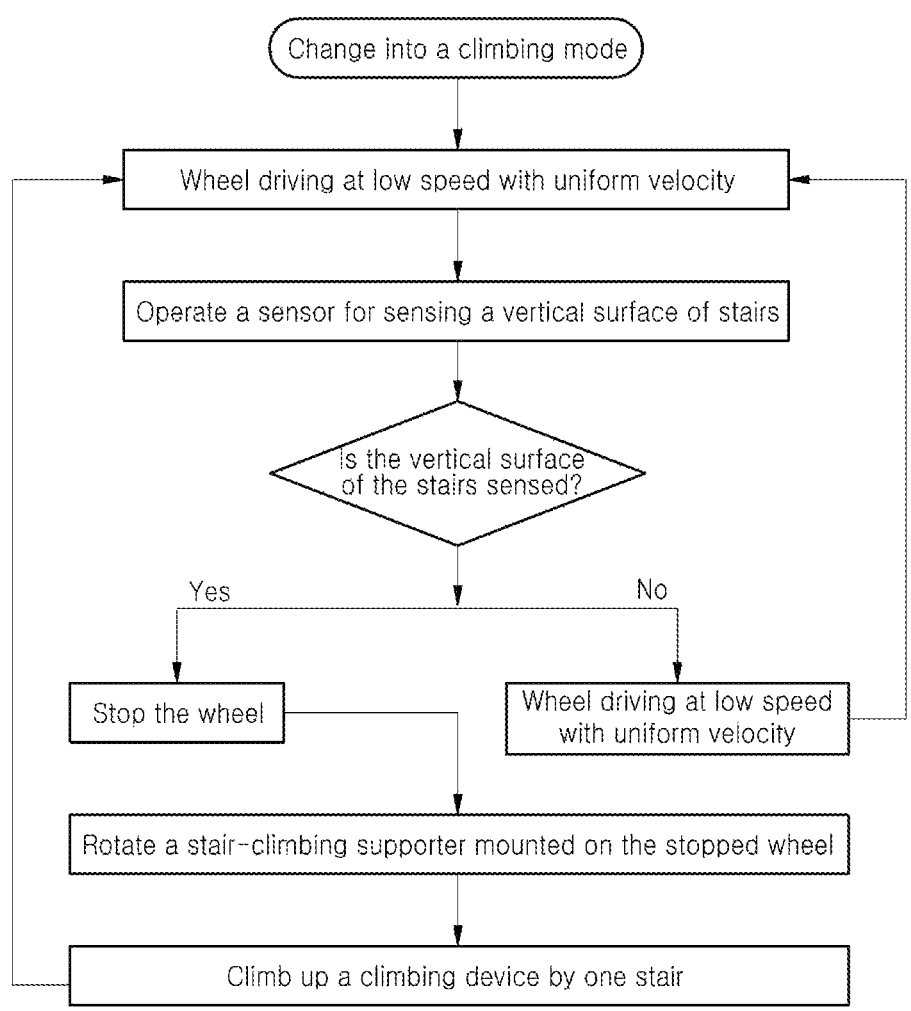

【Figure 6】
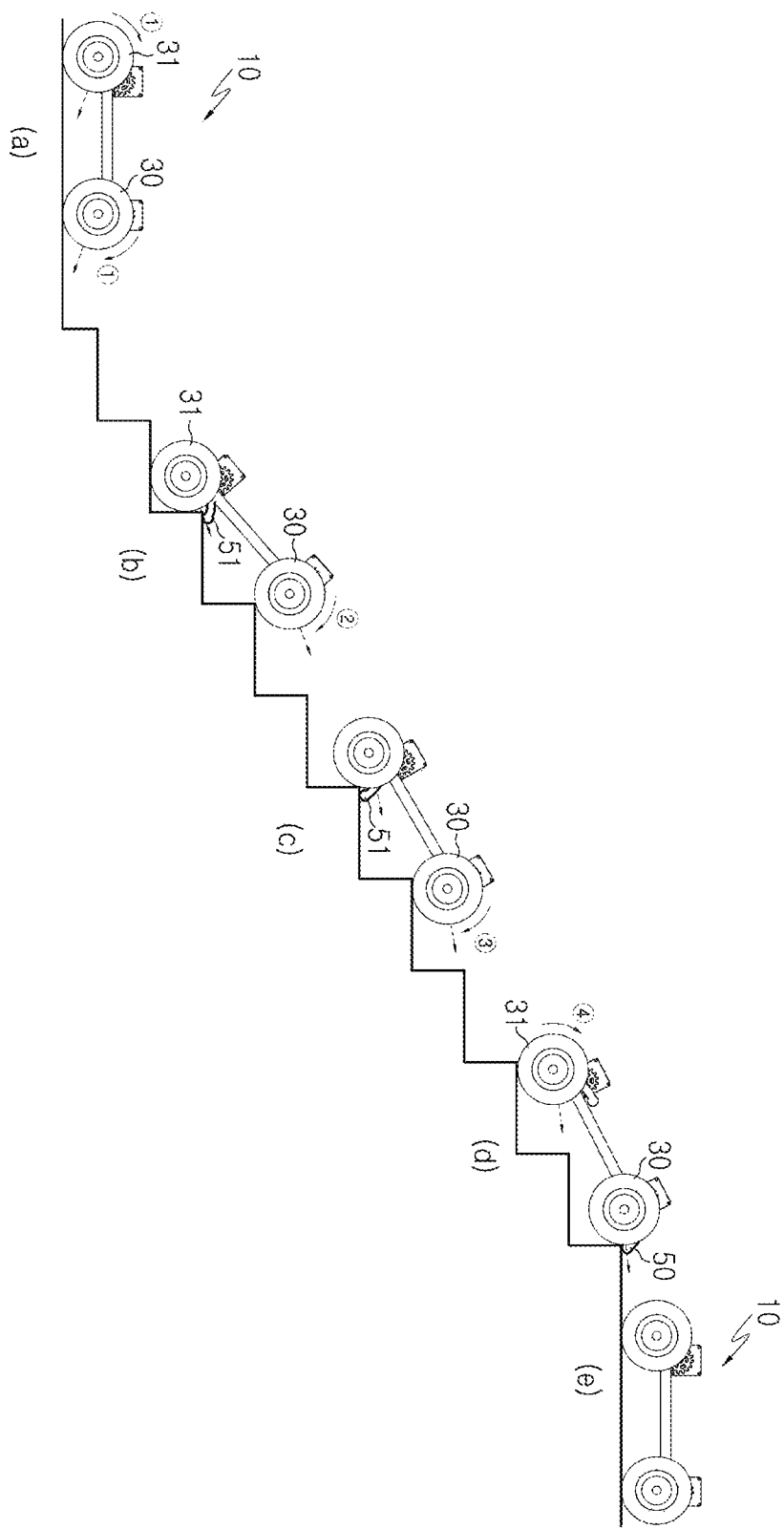

[Figure 7]
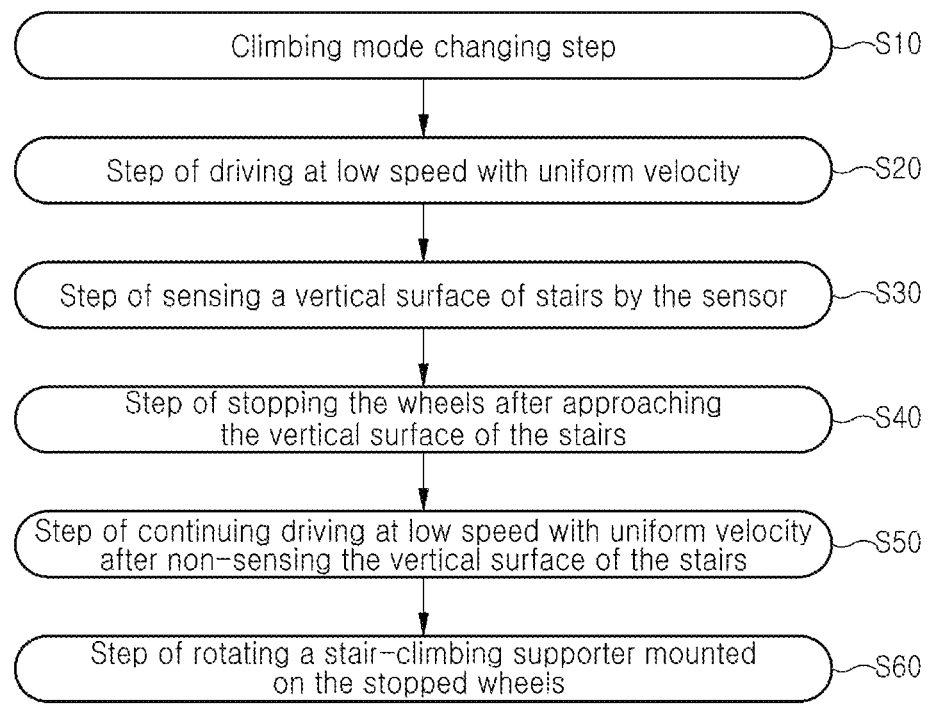

STAIR-CLIMBING TYPE DRIVING DEVICE AND CLIMBING DRIVING METHOD

BACKGROUND OF THE INVENTION

Field of the Invention

The present invention relates to a stair-climbing type driving device and a climbing driving method thereof, and more particularly, to a stair-climbing type driving device and a climbing driving method thereof, which can climb stairs in safety in response to heights and widths of different stairs.

Background Art

A four-wheel driving device to which technology of the present invention belongs is generally used as transportation means for the disabled or as experience means of four-wheel driving device for common people. The conventional four-wheel driving device has a problem in that it is very difficult and cumbersome to go up the stairs without other's helping when a rider arrives at a place where there are stepped portions, such as stairs, during driving.

In order to solve the problem, a conventional four-wheel driving device has caterpillar tracks mounted on the bottom surface of the four-wheel driving device, namely, on the inner bottom surface of wheels mounted at right and left sides of the four-wheel driving device. Therefore, when the four-wheel driving device meets stairs during driving, the four-wheel driving device makes the caterpillar tracks touch edge portions of the stairs, and then, climbs up the stairs using wide and strong contact force of the caterpillar tracks.

However, due to the caterpillar tracks' structure that is made in an oval shape by putting a belt made of a steel sheet on the circumference, if the four-wheel driving device having the caterpillar tracks loses its balance and stagers to right and left while climbing up the stairs, the four-wheel driving device may slip down the stairs. So, the conventional four-wheel driving device has a limitation as a driving device for the disabled who use it for the purpose of traveling.

Furthermore, even if the four-wheel driving device has a robot for fire extinguishment or a robot for industrial use mounted at an upper portion thereof, the four-wheel driving device may lose its balance and fall down. Therefore, the stair-climbing type driving device of the caterpillar track type has a security problem.

SUMMARY OF THE INVENTION

Accordingly, the present invention has been made to solve the above-mentioned problems occurring in the prior arts, and it is an object of the present invention to provide a stair-climbing type driving device, which can climb up stairs in safety regardless of height and width of the stairs when the disabled, common people who want to experience four-wheel driving devices, or robots for fire extinguishment or industrial use climb up the stairs, and a climbing driving method of the stair-climbing type driving device.

To accomplish the above object, according to the present invention, there is provided a stair-climbing type driving device including: a frame having a first wheel mounting stand and a second wheel mounting stand which are spaced apart from each other; a front motor mounting stand mounted at the front between the first wheel mounting stand and the second wheel mounting stand, wherein a front stair-climbing motor having a driving gear is mounted on the front motor mounting stand; a rear motor mounting stand mounted at the rear between the first wheel mounting stand and the second wheel mounting stand, wherein a rear stair-climbing motor having a driving gear is mounted on the rear motor mounting stand; front wheels mounted at the front side of the first and second wheel mounting stands, wherein in-wheel motors are mounted in the front wheels; rear wheels mounted at the rear side of the first and second wheel mounting stands, wherein in-wheel motors are mounted in the rear wheels; a front stair-climbing supporter mounted directly below the front motor mounting stand at the front between the first wheel mounting stand and the second wheel mounting stand; a rear stair-climbing supporter mounted directly below the rear motor mounting stand at the rear between the first wheel mounting stand and the second wheel mounting stand, wherein the front stair-climbing supporter or the rear stair-climbing supporter are mounted at the right and left in a pair on the basis of a connector; a slave gear mounted on the connector to be geared with the driving gear; front hollow parts formed between the front motor mounting stand and the first wheel mounting stand and between the front motor mounting stand and the second wheel mounting stand so that the front stair-climbing supporter can do a rotating action without any interference; rear hollow parts formed between the rear motor mounting stand and the first wheel mounting stand and between the rear motor mounting stand and the second wheel mounting stand so that the rear stair-climbing supporter can do a rotating action without any interference; a front sensor mounted at a portion of the front motor mounting stand; and a rear sensor mounted at a portion of the rear motor mounting stand.

In another aspect of the present invention, there is provided a climbing driving method of a stair-climbing type driving device including: a climbing mode changing step (S10) of converting a driving mode into a climbing mode by a rider's manipulation when a climbing device which is driving on a flatland meets stairs; a step (S20) of driving at low speed with uniform velocity, the step (S20) of operating a front sensor and a rear sensor, braking front wheels and rear wheels in rearward driving for safety, and driving forwards at low speed while keeping uniform velocity; a step (S30) of sensing a vertical surface of stairs by the sensor, the step (S30) of sensing a vertical surface of the stairs through the front sensor or the rear sensor and deciding whether or not the sensed sensor value corresponds to a predetermined set value; a step (S40) of stopping the wheels after approaching the vertical surface of the stairs, the step (S40) of stopping the corresponding wheel, stopping rearward driving for safety, and continuing forward driving without any driving power when a proximity distance between the front wheels or the rear wheels and the vertical surface of the stairs is recognized as the sensor set value; a step (S50) of continuing driving at low speed with uniform velocity after non-sensing the vertical surface of the stairs, the step (S50) of continuing driving at low speed while keeping uniform velocity of the corresponding wheel till the proximity distance between the front wheels or the rear wheels and the vertical surface of the stairs is recognized as the sensor set value if the proximity distance is not recognized as the sensor set value; and a step (S60) of rotating a stair-climbing supporter mounted on the stopped wheels, the step (S60) of allowing the front stair-climbing supporter or the rear stair-climbing supporter mounted on the stopped wheel to step on the horizontal surface of the upper stair and rotate once.

According to the present invention, the stair-climbing type driving device according to the present invention allows the climbing device used as a wheelchair for the disabled or the climbing device having a robot for fire extinguishment or for industrial use to climb the stairs in safety while keeping a stable posture. Especially, the stair-climbing type driving device according to the present invention provides a remarkable effect to expand a moving range of the disabled. Moreover, the stair-climbing type driving device according to the present invention can solve the problem of slip of the caterpillar tracks since it can step on the stairs like a person, differently from the conventional climbing device of the caterpillar track type.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 1 is a perspective view showing a driving order of a stair-climbing type driving device according to a preferred embodiment of the present invention;

FIGS. 2 and 3 are an exploded perspective view of the stair-climbing type driving device according to the preferred embodiment of the present invention;

FIG. 4 is a perspective view of the stair-climbing type driving device according to the preferred embodiment of the present invention;

FIG. 5 is a flow chart showing a driving method of a stair-climbing type driving device according to a preferred embodiment of the present invention;

FIG. 6 is a side view showing a driving order of the stair-climbing type driving device; and FIG. 7 is a flow chart of the driving method of the stair-climbing type driving device.

DETAILED DESCRIPTION OF THE PREFERRED EMBODIMENT

Hereinafter, reference will be now made in detail to the preferred embodiment of the present invention with reference to the attached drawings.

First, the present invention is characterized in that a front stair-climbing supporter 50 or a rear stair-climbing supporter 51 mounted at the front or the rear of a climbing device 10 steps on a horizontal surface of stairs and raises the climbing device 10 up the stairs. The front stair-climbing supporter 50 or the rear stair-climbing supporter 51 rotates according to a sensing signal of a front sensor 25 or a rear sensor 26 in a state that front wheels 30 or rear wheels 31 goes close to a vertical surface of the stairs.

FIG. 1 is a perspective view showing a driving order of a stair-climbing type driving device according to a preferred embodiment of the present invention. As shown in FIG. 1, when the climbing device 10, which is driving on a flat road surface, meets stairs, the climbing device 10 climbs stairs while the front stair-climbing supporter 50 or the rear stair-climbing supporter 51 operate by turns or simultaneously as if a person walks up the stairs.

A four-wheel driving device that people can usually see in daily lives is an electronic wheelchair for the disabled, which has a seat mounted at an upper portion of the four-wheel driving device. In order to move up or down at a subway station or a building, the electronic wheelchair is loaded in an elevator or on a lifting device for stairs.

However, in order to go up and down stairs mounted in a housing area, a pavement, a park, or other place, the rider of the four-wheel driving device must ask for help from others.

As shown in FIG. 1, the stair-climbing type driving device according to the present invention has a seat mounted at the upper portion thereof and a general mechanism necessary for operation, so can climb the stairs easily without helping from others, thereby enhancing convenience in driving.

For your reference, since the seat and the operation mechanism of wheelchair equipment or the four-wheel driving device, which may be mounted at the upper portion, are well-known structure and system and additional explanation inconsistent with the gist of the present invention, detailed descriptions of the seat and the operation mechanism of wheelchair equipment or the four-wheel driving device will be omitted.

FIGS. 2 and 3 are an exploded perspective view of the stair-climbing type driving device according to the preferred embodiment of the present invention. As shown in FIGS. 2 and 3, a frame 20 of the climbing device 10 is prepared, and the frame 20 is formed in a rectangular shape to be divided into a front part and a rear part.

In the drawings, the frame 20 includes: a first long wheel mounting stand 21 located at a portion of the left side thereof; a second wheel mounting stand 22 located at a portion of the right side; a front motor mounting stand 23 located at the front between the first wheel mounting stand 21 and the second wheel mounting stand 22 to mount a front stair-climbing motor 40; and a rear motor mounting stand 24 located at the rear between the first wheel mounting stand 21 and the second wheel mounting stand 22 to mount a rear stair-climbing motor 41. The mounting stands are connected with each other.

The front wheels 30, in which in-wheel motors 32 are mounted, are mounted at the front side of the first wheel mounting stand 21, and the rear wheels 31, in which in-wheel motors 32 are mounted, are mounted at the rear side of the first wheel mounting stand 21.

Furthermore, the front stair-climbing supporter 50, which steps on a horizontal surface of stairs and raises the climbing device 10 up the stairs, is mounted directly below the front motor mounting stand 23 at the front between the first wheel frame 20 and the second wheel frame 20. As shown in FIG. 2, a pair of the front stair-climbing supporters 50 are arranged symmetrically at right and left sides on the basis of the connector 52, and a slave gear 53 is mounted on the connector 52. As shown in FIG. 3, the slave gear 53 is geared with a driving gear 42 mounted on the front stair-climbing motor 40.

Additionally, as shown in FIG. 2, the front motor mounting stand 23 is mounted at the center of the front between the first wheel mounting stand 21 and the second wheel mounting stand 22, and front hollow parts 27 are formed between the front motor mounting stand 23 and the first wheel mounting stand 21 and between the front motor mounting stand 23 and the second wheel mounting stand 22, so that the front stair-climbing supporters 50 mounted at the front of the first wheel mounting stand 21 and the second wheel mounting stand 22 can be smoothly operated without any interference when rotating according to operation of the front stair-climbing motor 40.

In the meantime, the front wheels 30, in which in-wheel motors 32 are mounted, are mounted at the front side of the second wheel mounting stand 22, and the rear wheels 31, in which in-wheel motors 32 are mounted, are mounted at the rear side of the second wheel mounting stand 22. Furthermore, the rear stair-climbing supporter 51, which steps on a horizontal surface of stairs and raises the climbing device 10 up the stairs, is mounted directly below the rear motor mounting stand 24 at the rear between the first wheel frame 20 and the second wheel frame 20. As shown in FIG. 2, a pair of the rear stair-climbing supporters 51 are arranged symmetrically at right and left sides on the basis of the connector 52, and a slave gear 53 is mounted on the connector 52. As shown in FIG. 3, the slave gear 53 is geared with a driving gear 42 mounted on the rear stair-climbing motor 41.

Moreover, as shown in FIG. 2, the rear motor mounting stand 24 is mounted at the center of the rear between the first wheel mounting stand 21 and the second wheel mounting stand 22, and rear hollow parts 28 are formed between the rear motor mounting stand 24 and the first wheel mounting stand 21 and between the rear motor mounting stand 24 and the second wheel mounting stand 22, so that the rear stair-climbing supporters 51 mounted at the rear of the first wheel mounting stand 21 and the second wheel mounting stand 22 can be smoothly operated without any interference when rotating according to operation of the rear stair-climbing motor 41.

In the meantime, as shown in FIGS. 2 and 3, a front sensor 25 is mounted at a place of the front motor mounting stand 23. The front sensor 25 senses a vertical surface of the stairs, and adjusts an interval between the vertical surface of the stairs and the front wheel 30 according to an inputted setup value so that the front wheel 30 drives till approaching the vertical surface of the stairs, and then, stops.

Furthermore, as shown in FIGS. 2 and 3, a rear sensor 26 is mounted at a place of the rear motor mounting stand 24. The rear sensor 26 senses a vertical surface of the stairs, and adjusts an interval between the vertical surface of the stairs and the rear wheel 31 according to an inputted setup value so that the rear wheel 31 drives till approaching the vertical surface of the stairs, and then, stops.

The front sensor 25 and the rear sensor 26 sense a proximity distance between the vertical surface of the stairs and the front wheel 30 and the rear wheel 31, stop the wheels, and send a signal to rotate the front stair-climbing supporters 50 and the rear stair-climbing supporters 51 in order to allow the stair-climbing driving device 10 to climb up the stairs in safety.

For instance, even though the height and the width of the stairs are different according to places, if the front stair-climbing supporters 50 and the rear stair-climbing supporters 51 of the stair-climbing driving device 10 step on the horizontal surface of the stairs by uniform rotational motion, support points are in an unstable condition, so it is difficult to do a stair-climbing action stably.

Therefore, in order to climb stairs in safety in response to heights and widths of different stairs, through the function of the front sensor 25 and the rear sensor 26, the rotating action of the front stair-climbing supporters 50 and the rear stair-climbing supporters 51 is carried out in the state that the front wheel 30 and the rear wheel 31 approach the stairs.

FIG. 4 is a perspective view of the stair-climbing type driving device according to the preferred embodiment of the present invention. As shown in FIG. 4(A), when the climbing device 10 drives on a flatland, the climbing device drives in safety in a state that the front stair-climbing supporters 50 and the rear stair-climbing supporters 51 are embedded in the front hollow part 27 and the rear hollow part 28 without protruding. As shown in FIG. 4(B), when the climbing device 10 meets stairs during driving, the climbing device steps up the stairs while doing the rotating action in a state that the front stair-climbing supporters 50 and the rear stair-climbing supporters 51 protrude out of the front hollow part 27 and the rear hollow part 28.

FIG. 5 is a flow chart showing a driving method of a stair-climbing type driving device according to a preferred embodiment of the present invention. When the climbing device 10 which is driving the flatland meets stairs, a rider actuates a known control system to convert the driving mode into a climbing mode.

When the climbing device 10 is converted into the climbing mode, the wheels maintain uniform velocity and drives at low speed. When the sensor senses the vertical surface of the stairs, the sensor calculates a proximity distance between the wheels and the vertical surface of the stairs according to the set value, and stops the corresponding wheels.

Of course, if the proximity distance between the wheels and the vertical surface of the stairs does not fall under the previously set sensor value and the vertical surface of the stairs is not sensed, the wheels maintain uniform velocity and continue to drive at low speed.

In the meantime, when the corresponding wheels stop in the state that the wheels approach the vertical surface of the stairs according to the signal of the sensor, the front stair-climbing supporters 50 and the rear stair-climbing supporters 51 do the rotating action, and step on the horizontal surface of the upper stair and raise the climbing device 10 up one stair.

FIG. 6 is a side view showing a driving order of the stair-climbing type driving device, and FIG. 7 is a flow chart of the driving method of the stair-climbing type driving device. Referring to FIGS. 6 and 7, the driving method of the climbing device 10 will be described in detail as follows.

As shown in FIG. 6(A), when the climbing device 10 which is driving the flatland meets stairs, the rider operates a well-known control system by pressing a button or changing a direction of a manipulation lever (climbing mode changing step S10).

As described above, when the climbing device 10 is converted into the climbing mode, as indicated by the dotted line arrow in FIG. 6(A), the front sensor 25 and the rear sensor 26 are operated, and the front wheel 30 and the rear wheel 31 are put on hold in rearward driving for safety but drives forwards at low speed in the direction of the arrow number ① while keeping uniform velocity (step of driving with uniform velocity at low speed (S20).

When the front sensor 25 or the rear sensor 26 senses the vertical surface of the stairs while the climbing device 10 drives forwards at low speed with uniform velocity, the sensor decides whether the sensed sensor value is the predetermined set value (step of sensing a vertical surface of stairs by a sensor (S30).

As shown in FIG. 6(B), the climbing device 10, which drives at low speed while sensing the stairs by the sensor stops the rear wheel 31 at the time that the proximity distance between the rear wheel 31 and the vertical surface of the stairs is decided as the set value to prepare climbing (Step of stopping the wheels after approaching the vertical surface of the stairs S40).

In this instance, while the climbing device 10 climbs inclined stairs, it is preferable that the rear wheel 31 be put on hold in rearward driving and maintain a state to be able to drive forward without driving power.

In the meantime, as shown in FIG. 6(B), because the front wheel 30 is in the state that the front sensor 25 does not sense the vertical surface of the stairs, after the front sensor 25 grasps the proximity distance between the front wheel 30 and the vertical surface of the stairs as the set value, the front wheel 30 drives forwards while rotating in the direction of the arrow number ②till the front wheel 30 is stopped (step of continuing driving at low speed with uniform velocity after non-sensing the vertical surface of the stairs S50).

Therefore, as shown in FIG. 6(B), when the rear wheels are stopped in the state that the rear wheels approach the vertical surface of the stairs, while a pair of the rear stair-climbing supporter 51 mounted on the stopped rear wheels 31 rotate once, the rear wheels 31 step on the horizontal surface of the stairs and raise up the climbing device 10 as shown in FIG. 6(C) (step of rotating the stair-climbing supporter mounted on the stopped wheels S60).

In the meantime, as shown in FIG. 6(C), even in the moment that the climbing device 10 is raised up by the one rotation of the rear stair-climbing supporter 51, because the front sensor 25 does not sense the proximity distance between the front wheel and the vertical surface of the stairs, the front wheel 30 drives at low speed along the horizontal surface of the stairs while rotating in the direction of the arrow number ③, so that the climbing process together with the rotating action of the rear stair-climbing supporter 51 is easily carried out.

As shown in FIG. 6(D) even when the climbing device 10 is raised up by the one rotation of the front stair-climbing supporter 50, because the rear sensor 26 does not sense the proximity distance between the rear wheel 31 and the vertical surface of the stairs, the rear wheel 31 drives at low speed along the horizontal surface of the stairs while rotating in the direction of the arrow number ④, so that the climbing process together with the rotating action of the front stair-climbing supporter 50 is easily carried out, and the climbing device 10 can reach the final stair in safety.

For your reference, in the step (S60) that the stair-climbing supporter mounted on the stopped wheel carries out one rotation, the front stair-climbing supporter 50 and the rear stair-climbing supporter 51 may operate simultaneously or by turns.

As described above, the stair-climbing type driving device according to the present invention allows the climbing device used as a wheelchair for the disabled or the climbing device having a robot for fire extinguishment or for industrial use to climb the stairs in safety while keeping a stable posture. Especially, the stair-climbing type driving device according to the present invention provides a remarkable effect to expand a moving range of the disabled. Moreover, the stair-climbing type driving device according to the present invention can solve the problem of slip of the caterpillar tracks since it can step on the stairs like a person, differently from the conventional climbing device of the caterpillar track type.

What is claimed is:

1. A stair-climbing type driving device comprising:
   a frame having a first wheel mounting stand and a second wheel mounting stand which are spaced apart from each other;
   a front motor mounting stand mounted at the front between the first wheel mounting stand and the second wheel mounting stand, wherein a front stair-climbing motor having a driving gear is mounted on the front motor mounting stand;
   a rear motor mounting stand mounted at the rear between the first wheel mounting stand and the second wheel mounting stand, wherein a rear stair-climbing motor having a driving gear is mounted on the rear motor mounting stand;
   front wheels mounted at the front side of the first and second wheel mounting stands, wherein in-wheel motors are mounted in the front wheels;
   rear wheels mounted at the rear side of the first and second wheel mounting stands, wherein in-wheel motors are mounted in the rear wheels;
   a front stair-climbing supporter mounted directly below the front motor mounting stand at the front between the first wheel mounting stand and the second wheel mounting stand;
   a rear stair-climbing supporter mounted directly below the rear motor mounting stand at the rear between the first wheel mounting stand and the second wheel mounting stand, wherein the front stair-climbing supporter or the rear stair-climbing supporter are mounted at the right and left in a pair on the basis of a connector;
   a slave gear mounted on the connector to be geared with the driving gear;
   front hollow parts formed between the front motor mounting stand and the first wheel mounting stand and between the front motor mounting stand and the second wheel mounting stand so that the front stair-climbing supporter can do a rotating action without any interference;
   rear hollow parts formed between the rear motor mounting stand and the first wheel mounting stand and between the rear motor mounting stand and the second wheel mounting stand so that the rear stair-climbing supporter can do a rotating action without any interference;
   a front sensor mounted at a portion of the front motor mounting stand; and
   a rear sensor mounted at a portion of the rear motor mounting stand.

2. A climbing driving method of a stair-climbing type driving device comprising:
   a climbing mode changing step (S10) of converting a driving mode into a climbing mode by a rider's manipulation when a climbing device which is driving on a flatland meets stairs;
   a step (S20) of driving at low speed with uniform velocity, the step (S20) of operating a front sensor and a rear sensor, braking front wheels and rear wheels in rearward driving for safety, and driving forwards at low speed while keeping uniform velocity;
   a step (S30) of sensing a vertical surface of stairs by the sensor, the step (S30) of sensing a vertical surface of the stairs through the front sensor or the rear sensor and deciding whether or not the sensed sensor value corresponds to a predetermined set value;
   a step (S40) of stopping the wheels after approaching the vertical surface of the stairs, the step (S40) of stopping the corresponding wheel, stopping rearward driving for safety, and continuing forward driving without any driving power when a proximity distance between the front wheels or the rear wheels and the vertical surface of the stairs is recognized as the sensor set value;
   a step (S50) of continuing driving at low speed with uniform velocity after non-sensing the vertical surface of the stairs, the step (S50) of continuing driving at low speed while keeping uniform velocity of the corresponding wheel till the proximity distance between the front wheels or the rear wheels and the vertical surface of the stairs is recognized as the sensor set value if the proximity distance is not recognized as the sensor set value; and a step (S60) of rotating a stair-climbing supporter mounted on the stopped wheels, the step (S60) of allowing the front stair-climbing supporter or the rear stair-climbing supporter mounted on the stopped wheel to step on the horizontal surface of the upper stair and rotate once.

\* \* \* \* \*